Dec. 24, 1929.                R. BIQUARD                1,740,762
          DEVICE FOR DETERMINING DEFECTS IN THE STATIC
             AND DYNAMIC BALANCES OF ROTATING BODIES
                    Filed Nov. 6, 1925            3 Sheets-Sheet 1

Robert Biquard
              INVENTOR
By: Marks and Clerk
              Attys

Dec. 24, 1929.                 R. BIQUARD                        1,740,762
          DEVICE FOR DETERMINING DEFECTS IN THE STATIC
             AND DYNAMIC BALANCES OF ROTATING BODIES
                      Filed Nov. 6, 1925           3 Sheets-Sheet 2

Robert Biquard
INVENTOR

By: Marks and Clerk
Attys

Dec. 24, 1929.                    R. BIQUARD                      1,740,762
          DEVICE FOR DETERMINING DEFECTS IN THE STATIC
            AND DYNAMIC BALANCES OF ROTATING BODIES
                       Filed Nov. 6, 1925              3 Sheets-Sheet 3
Fig.7.              Fig.6.
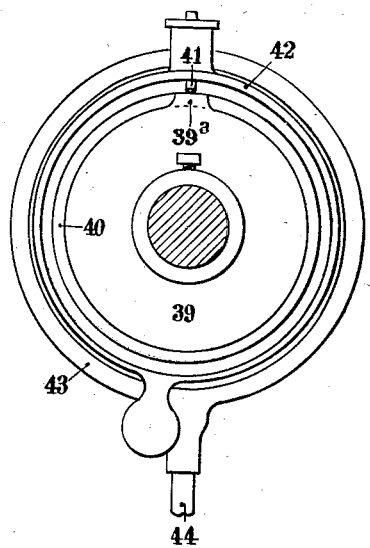 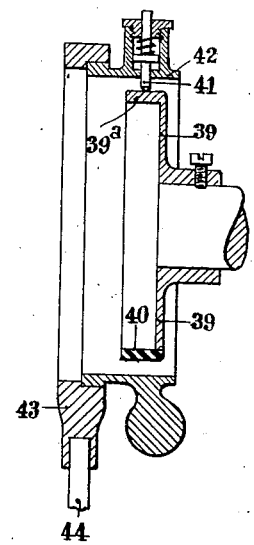
Fig.8.   Fig.9.
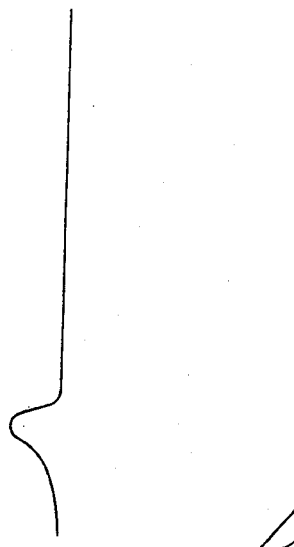 
R. Biquard
    INVENTOR
By: Marks & Clerk
         Attys.

Patented Dec. 24, 1929

1,740,762

UNITED STATES PATENT OFFICE

ROBERT BIQUARD, OF NEUILLY-SUR-SEINE, FRANCE

DEVICE FOR DETERMINING DEFECTS IN THE STATIC AND DYNAMIC BALANCES OF ROTATING BODIES

Application filed November 6, 1925, Serial No. 67,452, and in France November 12, 1924.

This invention relates to a method and devices for indicating in magnitude and direction defects in the static and dynamic balance of bodies which are to be subjected to rotation.

It is known that the lack of static balance or faulty static balance of a rotating body is due to the fact that the centre of gravity of the body does not lie on the axis of rotation and that the lack of dynamic balance or faulty dynamic balance is due to the fact that the axis of rotation does not coincide or is not parallel with one of the principal axes of inertia.

The method according to the invention enables the direction and magnitude of these two defects in balance, static and dynamic to be determined in an absolute manner and in a single operation and to be balanced by reducing the total effect of these two defects in balance to a single centrifugal force and a centrifugal couple acting in different planes. The method consists in making the body rotate on itself by supporting its shaft horizontally and in its usual bearings upon bearings which are adapted to move horizontally, perpendicularly to the mean direction of this shaft and are brought back to their mean positions by an elastic arrangement, and in measuring, by means of one and the same pivotal arrangement, on the one hand the magnitude of the static defect in balance by the amplitude of the oscillation of the centre of gravity of the rotating body and, on the other hand, the magnitude of the dynamic defect in balance by the angular amplitude of the oscillation about its mean direction of the shaft upon which the body rotates.

The apparatus for carrying out the method is chiefly characterized by the following features:

(a) The two bearings which are movable in a direction perpendicular to that of the axis of rotation of the body at rest may move in this direction at the same time and independently of each other.

(b) The two movable bearings and the elastic returning device are connected to a rigid rod by pivotal connections such that this rod is always parallel to the axis of rotation of the body and at a constant distance from this axis whatever be these displacements.

(c) The total effect of the forces exerted by the elastic device upon the movable bearings can always be reduced to a horizontal force acting in the vertical plane which contains the centre of gravity of the rotating body and a horizontal couple having its centre in the same plane and its lever arm parallel to the axis of rotation.

(d) The whole of the bearings, the elastic returning device, the rigid rod and the joint members may be made, by means of an adjustable compensating mass, to have its centre of gravity in the vertical plane perpendicular to the axis of rotation which contains the vertical axis of symmetry of the elastic arrangement and the centre of gravity of the body, whatever be the position of the two bearings.

(e) The indication of the central planes in which lie the forces or couples replacing the defects in balance is obtained by means of an indicating device mounted upon the shaft of rotation and adapted to be displaced angularly about the said shaft when the apparatus is working in such a way that the signal or indication it produces for each turn of the rotating body may be synchronized with one of the maxima of amplitude or oscillation of either the centre of gravity or the direction of the shaft of rotation. The position of the indicator which corresponds to synchronization enables the direction of the defect in balance producing the oscillation with regard to which the synchronization has been effected to be referred to a datum, account being taken of a lag which is eliminated by a second operation in which the body is rotated in an opposite direction at the same speed.

The description hereinafter given will make the invention quite clear. This description relates to the accompanying drawing which is given by way of example only and in which.

Figure 5:
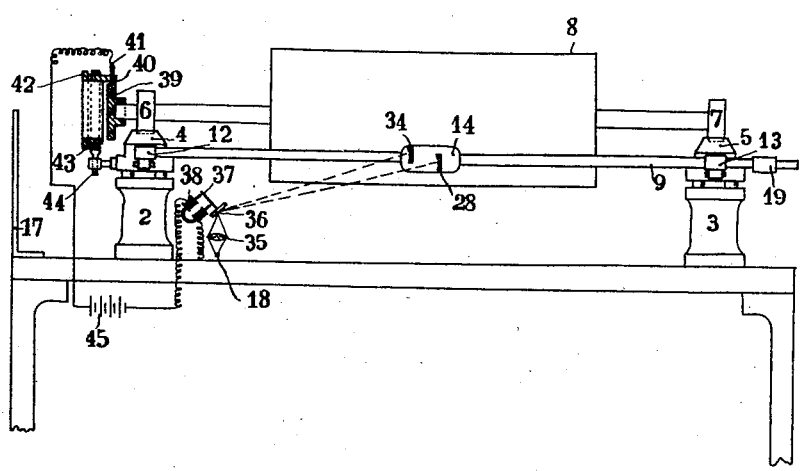
Fig. 5 shows the application to a device of the type shown in Figures 1 and 2 of means for determining the position of the central plane along which is directed the centrifugal force replacing the defect in static balance and the centrifugal plane in which is directed the centrifugal couple replacing the defect in dynamic balance.

Fig. 6 is an enlarged fragmentary section of the parts shown at the upper left hand corner of Fig. 5. Fig. 7 is a side view of Fig. 6. Figs. 8 and 9 represent the bend in the light ray.

Figure 1:
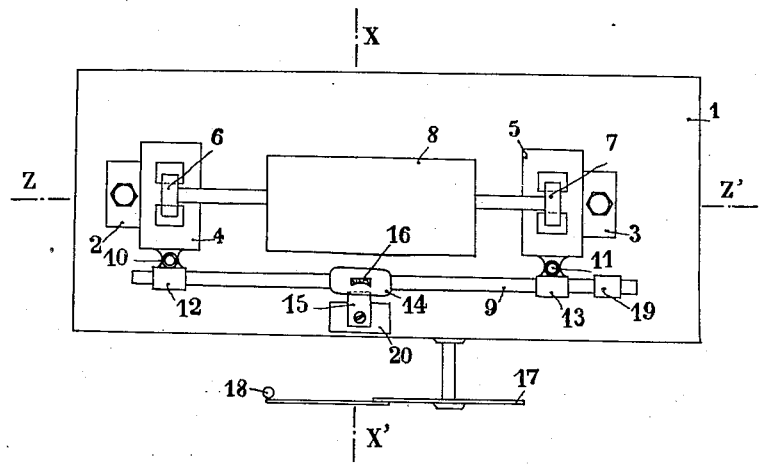
Fig. 1 is a plan view of a device for embodying the method according to the invention.
Figure 2:
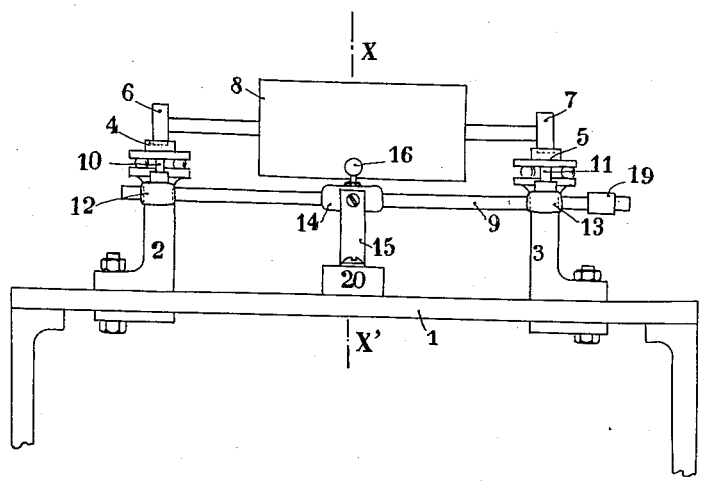
Fig. 2 is a corresponding elevation.

In Figs. 1 and 2, 1 is the frame of the apparatus similar to a lathe bed and provided with longitudinal slides upon which supports 2 and 3, which are fixed in a suitable position by means of a tightening device similar to the one employed for the tool holder on a lathe, are adapted to move in a direction parallel to the axis Z, Z'.

The supports 2 and 3 terminate at their upper part in straight sliding tracks provided with grooves or preferably balls upon which two bearings 4 and 5 are adapted to move perpendicularly to the axis Z, Z'. The bearings 4 and 5 receive the bearings 6 and 7 of the body under consideration which is indicated by the reference numeral 8.

The bearings 4 and 5 are connected to each other by a horizontal bar 9 of cylindrical shape, for example, by means of devices consisting, for each bearing, of a vertical rod 10 or 11 integrally attached to the bearing and a nut 12 or 13 formed of two perpendicular sleeves in which the bar 9 and the rod 10 or 11 slide respectively and freely but without clearance.

The bar 9 is rigidly connected by a sleeve 14 to the upper end of an elastic blade 15 which is itself secured in at its lower part to a fixed boss 20 formed upon the frame 1. The sleeve 14 carries in the vertical axis of symmetry of the blade spring 15 a vertical concave mirror 16 the plane of which is parallel to the axis of rotation of the body 8, which mirrow reflects the image of a point-shaped source of light 18 on to a screen 17.

Upon the bar 9 or upon an integrally attached parallel bar is adapted to move a mass 19, the position of which is adjusted and fixed according to the position of the bearings 4 and 5 in such a way that this mass brings back into the vertical plane of symmetry X, X' of the spring 15 the centre of gravity of the arrangement formed by the bearings 4 and 5, the rods 10 and 11, the nuts 12 and 13, the bar 9, the sleeve 14 and the mass 19 itself. The adjustment of the mass 19 is effected without trouble if the bar 9 is provided with a scale enabling the distances of the bearings to the plane X, X' to be read and if a graph has been drawn of the position to be given to the said mass 19 for all distances of these bearings from the plane X, X'.

The body 8 is rotated by any means, for example a belt which acts upon it in a symmetrical manner relatively to the vertical plane X, X' which contains its centre of gravity, or else two belts acting upon it in two planes symmetrical relatively to the plane X, X'. These belts also pass over driving pulleys placed above or below the bed 1 and having their axes in the vertical plane containing the axis of rotation of the body 8.

When the body 8 rotates the bearings 4 and 5 each make an oscillatory movement due to the effect of the horizontal components of the centrifugal forces or couples produced by the defects in balance. These movements are transmitted by the rods 10 and 11 and the nuts 12 and 13 to the bar 9 which also transmits to the bearings the force returning them to the mean position which is exerted by the spring 15.

The movement of the bar 9 may be broken up into two movements comprising: a horizontal reciprocating movement perpendicular to its mean direction (to the axis Z, Z') and an angular to-and-fro movement relatively to its mean direction. In the first of these two movements which is due to the defect in static balance the bar 9 remains parallel to itself but oscillates about its longitudinal axis on account of the fact that the blade spring 15 is secured at both ends so that the movement is translated into a vertical displacement of the image of the source of light 18 reflected by the mirror 16 upon the screen 17. The second of these two movements due to the defect in dynamic balance is translated into a horizontal movement of the image of the source of light 18.

The resultant of the new displacements of the image of the source of light 18 upon the screen is a straight line or a closed curve (circle, ellipse, etc.) according to the relative positions of the central planes in which act the forces due to the defects in balance.

Whatever be this resultant it is easy to determine the vertical and horizontal amplitude of the displacement of the image. These amplitudes are sufficiently nearly proportional to the magnitude of the centrifugal force and couple replacing the defects in balance which produce them respectively. The machine being previously calibrated for a given body and a given speed by means of defects in balance of known amount, obtained for example by additional masses attached to the body, it is possible to draw up tables which indicate the connection between the amplitudes and the magnitude of the defects in balance.

Figure 3:
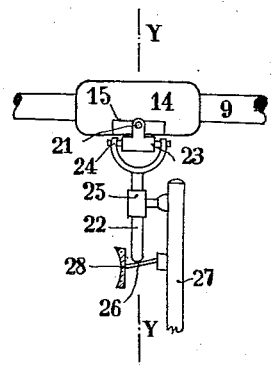
Fig. 3 is a plan view of a device for indicating the magnitude of the defect in static balance.

In Figure 3 which shows a device indicating the magnitude of the defect in static balance, 15 indicates, as in the previous case the sleeve carried by the bar 9 and in which is secured the upper end of of the elastic blade 15. A vertical cylindrical rod 21 integrally attached to the sleeve 14 is carried by this sleeve in such a way that its axis coincides with the vertical axis of symmetry of the elastic blade 15. This rod is connected to a horizontal rod 22 by means of a nut 23 formed of two sleeves placed one above the other perpendicularly, and of a shaft 24 which passes through the fork-shaped end of the rod 22. The sleeves of the nut 23 can slide and turn freely upon the shafts 21 and 24 and thus form a universal joint.

The rod 22 being guided in a fixed sleeve 25 its free end bears against a blade spring 26, one end of which is secured in a member 27 integrally attached to the frame 1 of the machine, the other end of the spring carrying a vertical concave mirror 28, the plane of which is perpendicular to the axis of the bar 9. When the bar 9 is moved, the rod 21 makes a reciprocating movement parallel to the axes $y$—$y'$, the amplitude of which movement corresponds to the amount of the defect in static balance alone. The movement of the rod 21 is transmitted by the nut 23 and the shaft 24 to the rod 22, the end of which causes the spring 25 and the mirror 28, which is integrally attached to it, to make angular movements which for small angles are practically proportional to the displacements of the rod 21. The amplification is as much greater as the spring is shorter.

Finally, the movement of the centre of gravity of the arrangement connected to the bar 9 which, as mentioned above, is the same as the movement of the centre of gravity of the body 8 is translated into a horizontal displacement of the image reflected by the mirror 28 of a fixed source of light; this displacement therefore indicates the defect in static balance.

Figure 4:
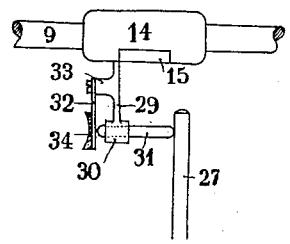
Fig. 4 is a plan view of a device for indicating the magnitude of the effect in dynamic balance.

In Figure 4, which shows a device for indicating the amount of the defect in dynamic balance, 14 indicates, as in the previous case, the sleeve carried upon the bar 9 and in which the upper end of the elastic blade 15 is secured. A member 29, integrally attached to the sleeve 14, terminates at its end in a small sleeve 30 in which slides an arm 31; the latter is held in contact which a member 27 integrally attached to the frame of the machine by a blade spring 32, one end of which is attached to a boss 33 upon the member 29, the other end carrying a concave mirror 34 the plane of which is perpendicular to the plane of the axis of the bar 9. The axis of the arm 31 is strictly parallel to the axis of the bar 9 and the plane of contact of the fixed member 27 is strictly perpendicular to it.

The member 29 integrally attached to the sleeve 14 remains parallel to the member 27 for every displacement of the bar 9 perpendicular to it, but moves away from or approaches it for any variation in the direction of this bar. The angular displacements of the bar 9 are therefore changed into displacements of the arm 31 in its sleeve 30 and corresponding angular displacements of the spring blade 32 and of the mirror 34 and, finally, into horizontal displacements of the image given by the mirror of a fixed source of light. These displacements being only connected with the variations in the direction of the bar 9, and consequently to that of the axis of rotation of the body 8 they therefore indicate the defect in dynamic balance.

The use at the same time on one and the same machine of the devices shown in Figures 3 and 4 enables the amount of the two defects in balance to be measured at the same time and independently of each other by the horizontal displacements of the images given by two concave mirrors of one and the same fixed source of light. Figures 5 and 7 show the application of this device to a machine similar to the one described with reference to Figures 1 and 2 and the reference numerals in Figure 5 correspond to those in the previous figures.

The source of light 18 first sends its luminous beam upon a convergent lens 35 and then upon a plane mirror 36 placed in front of the front plane passing through the concave mirrors 38 and 34, so that the latter produce the images of the source 18 upon the screen 17. The mirror 36 is integrally attached to an iron plate 37 which is adapted to oscillate about a horizontal axis perpendicular to the plane of the figure under the action of the electro-magnet 38.

39 is a plate provided with a sleeve which enables it to be fixed upon the shaft of the body 8, either at the end or in any intermediate position. This plate is provided on its periphery with an insulating crown 40 leaving only a narrow strip 39$^a$ conducting to the mass and parallel to the axis. Upon this insulating crown presses a metal brush 41 carried upon a crown 42 which is adapted to turn, with very little friction, with a ring 43, itself carried by a support 44 which is adjustable in height and is integrally attached to the bearing 4.

The brush 41 is connected to one of the poles of a source of current 45, the other pole of which is connected to the electro-magnet 38; the other pole of the latter is connected to the metallic mass of the frame in such a way that its excitation circuit is closed through the various metal parts of the machine.

For each turn of the body to be balanced the brush 41 closes for a very short time the circuit of the electro-magnet 38 and this attracts the plate 37 integrally attached to the mirror 36. The displacement of this mirror results in a slight bending in the luminous lines forming the images of the source 18 given by the mirrors 28 and 34 upon the screen 17.

By rotating the crown 42 in the ring 43 the brush 41 is displaced until the bend in the luminous line given by the mirror 28, for example, arrives at one of the ends of this line; under these conditions the circuit is closed at the moment when the centre of gravity of the body 8 is at its maximum amplitude of horizontal displacement. At this moment the central plane containing the centrifugal force corresponding to the defect in static balance is not in the horizontal plane but at a phase difference in front of it by an amount equal to an angle $\varphi$ which is a function of the inertias brought into play and of the speed of rotation. In order to eliminate this unknown angle $\varphi$ it is sufficient to recommence the operation by rotating the body under consideration at the same speed in the opposite direction. A second position of the brush 41 is found.

In order to know the exact plane of the defect of static balance it is sufficient to bring the brush 41 exactly at the centre of the two positions found for the two directions of rotation, then to place the body 8 in an azimuth, such that the circuit of the electro-magnet 38 is closed. The central plane containing the centrifugal force of the defect in static balance is then exactly horizontal and this force is directed on the same side as the maximum amplitude at which the bend was produced in the image of the source 18 given by the mirror 28.

The same method is carried out with the mirror 34 in order to obtain the central plane of the defect in dynamic balance.

Naturally the constructional arrangements illustrated and described above have only been chosen by way of example and do not limit the invention in any way.

Claims:—

1. A device for determining in magnitude and direction the static and dynamic lack or defects in balance in bodies with are to be subjected to rotation comprising two bearings adjustable in distance and movable in a horizontal direction, perpendicular to the axis of rotation of the body to be balanced, a coupling bar connecting the two bearings together, members for pivotally connecting said bar with the two bearings, a spring adapted to have a vertical axis of symmetry in the vertical plane which contains the center of gravity of the body to be balanced transmitting to the bearings, through the medium of the coupling bar, the forces of reaction against their own oscillations, a compensating mass for bringing the centre of gravity of the whole of this arrangement in the vertical plane of symmetry of the return spring, perpendicular to the axis of rotation, and a vertical concave mirror carried by said spring the axis of which is in the same plane of symmetry and the plane of which is parallel to the coupling member.

2. In a device for determining in magnitude and direction the static and dynamic lack or defects in balance in bodies which are to be subjected to rotation means for amplifying the displacements of the centre or gravity of the rotating body which comprise bearings, an elastic arrangement for returning the bearings including a vertical rod the axis of which coincides with the vertical axis of symmetry of the elastic arrangement, a horizontal rod, a double pivotal connection connecting the elastic arrangement to the horizontal rod perpendicular to the axis of rotation of the body, a spring pressed upon by this second rod secured at one end in a fixed member and carrying at its other end a concave mirror.

3. In a device for determining in magnitude and direction the static and dynamic lack or defects in balance in bodies which are to be subjected to rotation, means for amplifying the angular displacement of the axis of rotation of the rotating body, comprising movable bearings, a coupling bar connecting the bearings, a horizontal rod perpendicular to the coupling bar of the movable bearings and integrally attached to said bar, a spring blade carried by the perpendicular rod and a concave mirror carried by the blade, a fixed member disposed perpendicularly to the axis of rotation, a movable arm parallel to the coupling bar and movable in the end of the perpendicular rod in contact with, on the one hand, the fixed member, and, on the other hand, the spring blade.

4. In a device for determining in magnitude and direction the static and dynamic lack or defects in balance in body which are to be subjected to rotation, means for determining the planes passing through the axis of rotation which contain the force and couple replacing the defects in balance mounted upon the axis of rotation and adapted to be moved angularly about this body, and means for closing an electric circuit at the moment the centre of gravity or the direction of the axis of rotation of the body to be balanced passes through a maximum amplitude of oscillation, and means for referring to a datum the angular position of the rotating body at the moment the circuit is closed.

ROBERT BIQUARD.